United States Patent [19]

Esanu

[11] 3,903,088

[45] Sept. 2, 1975

[54] 4-[N-(2-METHYL-3-HYDROXY-4-HYDROXYMETHYL-5-PYRIDYLMETHYL)-PIPERAZINO]-P-FLUORO-BUTYROPHENONE

[75] Inventor: André Esanu, Paris, France

[73] Assignee: Societe d'Etudes de Produits Chimiques, Molineaux, France

[22] Filed: Mar. 15, 1974

[21] Appl. No.: 451,513

[30] Foreign Application Priority Data
Mar. 28, 1973 United Kingdom............... 14815/73

[52] U.S. Cl............................ 260/268 H; 424/250
[51] Int. Cl.²........................ C07D 295/12
[58] Field of Search.................. 260/268 H

[56] References Cited
UNITED STATES PATENTS

| | | | |
|---|---|---|---|
| 3,557,131 | 1/1971 | Yoshimura et al........... | 260/295.5 R |
| 3,717,636 | 2/1973 | Esanu ........................ | 260/268 H |
| 3,812,126 | 5/1974 | Züst et al..................... | 260/268 H |

Primary Examiner—Donald G. Daus
Assistant Examiner—Jose Tovar
Attorney, Agent, or Firm—Eyre, Mann & Lucas

[57] ABSTRACT

This invention relates to the preparation and use of new piperazine derivatives, the therapeutically acceptable salts of 4-[(2-methyl-3-hydroxy-4-hydroxymethyl)-5-pyridyl N-methyl-N'-piperazinyl]-p-fluorobutyrophenone of the formula:

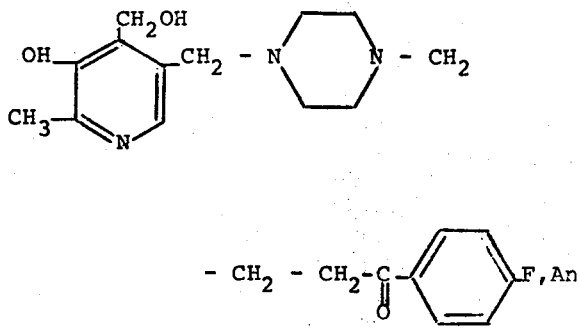

wherein:
   A is the selected acid and
   $n$ is an integer taking the values 1, 2, 3 and 4.

These compounds may enter into anti-hypertensive drugs.

2 Claims, No Drawings

4-[N-(2-METHYL-3-HYDROXY-4-HYDROXYMETHYL-5-PYRIDYLMETHYL)-PIPERAZINO]-P-FLUORO-BUTYROPHENONE

NEW PIPERAZINE DERIVATIVES AND THEIR PROCESS OF PREPARATION

This invention relates to new piperazine derivatives and their process of preparation. The new derivatives according to this invention are the salts of 4-[(2-methyl-3-hydroxy-4-hydroxymethyl)-5-pyridyl N-methyl-N-piperazinyl]-p-fluoro-butyrophenone with therapeutically acceptable acids.
Their formula is:

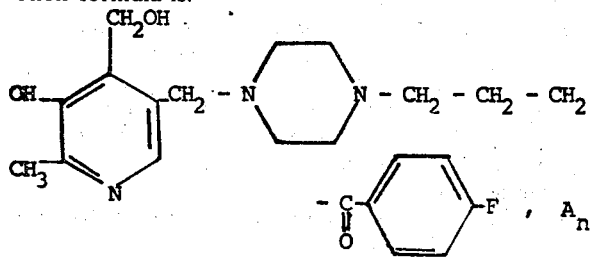

wherein:
A is the selected acid and
n is an integer taking the values 1, 2, 3 or 4.
Usually selected acids are hydrochloric, acetic, any of the chloracetic, benzoic, maleic, for instance.

The invention will be illustrated by the example of the maleic salt.

The empirical formula of this derivative is $C_{34}H_{40}O_{15}N_3F$ and its molecular weight is 749.7. The derivative is beige-yellow powder melting at 127/130C, soluble in water at room temperature, soluble in warm ethanol and octanol and insoluble in chloroform. It shows interesting hypotensive and adrenolitic properties, with a marked -blocking action associated with a hypotensive action comparable and even superior to that of reserpine.

The above derivative may be prepared according to this invention by reacting in xylene, 3,4-isopropylidenyl-5-piperazinyl-pyridoxine and 4-chloro-p-fluoro butyrophenone in the presence of triethylamine, according to the following reaction scheme:

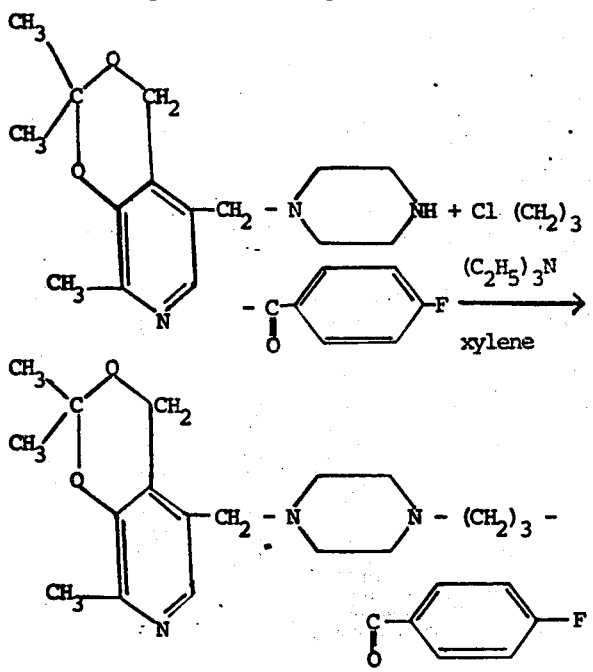

The compound thus obtained is reacted with maleic acid which leads first to the breaking of the isopropylidene bridge and secondly to the formation of a salt with 3 moles of maleic acid per mole of the pyridoxine derivative.

The preparation is exemplified as follows.

EXAMPLE

In a 10 litre reactor fitted with stirring means, cooling and heating means there were poured 530 g (1.85 mole) of 3,4-isopropylenyl 5-piperazinyl-pyridoxine, 480 g (2.4 moles of 4-chloro-p-fluoro-butyrophenone, 240 g (2.4 moles) of triethylamine and 5 litres of anhydrous xylene. After stirring there was a complete dissolution of the ingredients in the xylene and the mixture was refluxed for 15 hours during which time the mixture turned brown and a precipitate was formed. This precipitate was separated, filtered, dried washed and treated with 5 litres of a 90% solution of petroleum ether in diethyl ether which gave after drying 550 g of a product. This product was then recrystallised from isopropanol. Yield : 460 g of a product melting at 114C to 115C, being 3,4-isopropylidenyl-pyridoxin-5-yl-4-piperazin-1-yl-p-fluoro-4-butyro-phenone. This compound was then treated with maleic acid in the same 10 litre reactor as above. There were poured into this reactor 6 litres of distilled water containing 2% of ethanol, 400 g (3.4 moles) of maleic acid and 300 g (0.68 mole) of the isopropyliden derivative obtained in the previous step. The mixture was refluxed for 30 minutes then evaporated to dryness under reduced pressure. The residue was treated with ethyl alcohol and recrystallized from 3 litres of pure ethyl alcohol. Yield : 420 g of a beige-yellow product melting at 127/130C the analysis of which corresponds to the formula $C_{34}H_{40}O_{15}N_3F$. The 3,4-isopropylidenyl-5-piperazinyl-pyridoxine was obtained by the reaction of monocarbosyethyl piperazine on 3,4-isopropylidenyl-5-chloro-pyridoxine in anhydrous dimethyl formamide and in the presence of potassium carbonate. The 3,4-isopropylidenyl-5-chloro-pyridoxine was obtained by chlorination by $SO_2Cl_2$ of the 3,4-isopropylidene pyridoxine which was obtained as described in previous U.S. Pat. No. 3,717,636.

The anti-hypertensive activity of one of the compounds of the invention, as the one described in the above mentioned example, which is named hereunder "test compound" or "PxPIFB-M" has been tested in renal (Goldblatt) and metacorticoid (DOCA) hypertensive rats, compared to the standard preparations of guanethidine and -methyldopa. A complementary investigation has been undertaken on normally hypertensive rats of the Okamoto strain. For the main investigation there were used male albino rats (CFY strain) obtained from Carworth Europe. Implant pellets of Desoxycorticosterone acetate (DOCA) were obtained from Organon Laboratories Ltd. Guanethidine sulphate (Ismeline tablets, CIBA), -methyldopa (Aldomet tablets, MSD) subsequently referred to as methyldopa

METHODS -

Preparation of Goldblatt hypertensive rats
This method is similar to that described by Goldblatt, H., Lynch, J., Hanzal, R. F. and Summerville, W. W. (1934) J. Exp. Med., 59, 347–379
Male rats of Carworth CFY strain (120–140 g) were used. Under sterile conditions, and using ether anaesthesia, a costolumbar incision was made and the left kidney was retracted towards the abdomen. The renal pedicle was exposed and the artery dissected clean. A silver clip was placed around the artery, near the abdominal aorta. The right kidney was removed through a second incision. The body wall was sutured with catgut, and the skin closed with autoclips. Each rat was then given 30,000 IU Procaine Penicillin G by the intra-muscular route. Hypertension developed slowly over a period of 6-9 weeks.

Preparation of DOCA hypertensive rats

This method is similar to that described by Green, D. M., Saunders, F. J., Wahlgren, N. & Craig, R. L. (1952) Am. J. Physiol, 170, 94–106

Male rats of Carworth CFY strain (90–120 g) were used. Under sterile conditions, and using ether anaesthesia, an incision was made on the left side of the abdominal wall of the rat and the left kidney removed. A 50 mg pellet of DOCA was implanted sub cutaneously. The body wall was sutured with catgut, and the skin closed with autoclips. Each rat was then given 30,000 IU Procaine Penicillin G by the intramuscular route. Drinking water was replaced by 0.8% sodium chloride and 0.1% potassium chloride in tap water. Hypertension developed slowly over a period of 5–8 weeks.

Experimental design

The rats were deprived of food but not water for 18 hours prior to an experiment. The blood pressure of each rat was recorded before, and at 2, 4, 8 and 24 hours after drug administration. Compounds were suspended in 1% carboxymethylcellulose and administered at a dose volume of 10 ml/kg. Groups of 8 animals were used. Blood pressure was measured indirectly from the caudal artery by a modification of the method described by Ben-Ziv, G., Weinman J. and Sulman, F. G. (1964) Arch. int. Pharmacodyn, 149, 527–535.

RESULTS

The mean blood pressure for each group prior to, and at 2, 4, 8 and 24 hours after drug administration is shown in Table 1. The percentage change of mean pressure from the pre-dose vlaue is also shown in Table 1.

The group mean systolic and diastolic blood pressures prior to and at various times after drug administration are shown in Table 2 for Goldblatt rats, and Table 3 for DOCA rats.

The complementary investigation on OKAMOTO hypertensive rats was undertaken by the same technic as above with the unique dose of 25 mg/kg for the standard and test compounds.

From an examination of the data one can make the following comments.

1. The two standard compounds, methyldopa and guanethidine, and the test compound PxPIFB-M all significantly reduced the blood pressure of Goldblatt, DOCA and OKAMOTO hypertensive rats.
2. Methyldopa had approximately the same antihypertensive activity in Goldblatt and DOCA rats and the best one
3. PxPIFB-M appears to be the most active on OKAMOTO rats.

TOXICITY

Toxicity on mice showed a value of 1.0 g per os and 0.5 g intraperitoneously.

PRESENTATION

Any suitable form can be used and for instance, tablets are obtained from the following preparation (parts in weight):

| | |
|---|---|
| PxPIFB-M | 50 |
| starch | 40 |
| Microcrystalline cellulose | 31.5 |
| Silicic acid | 2.5 |
| Magnesium stearate | 1 |
| | 100 |

Tablets were of 100 mg (breakable) containing 50 mg of active product. Normal doses to be used daily in human therapy are between 25 and 500 mg and more generally between 50 and 250 mg.

TABLE 1

The mean blood pressures of each group taken before and at 2, 4, 8 and 24 hours after drug administration and percentage change of mean blood pressure from the value before drug administration (0 hr.)

| Model of hypertension | Compound | Oral dose mg/kg | Mean BP (mmHg) at time | | | | | % change in mean BP from O hr | | | |
|---|---|---|---|---|---|---|---|---|---|---|---|
| | | | 0 hr | 2 hr | 4 hr | 8 hr | 24 hr | 2 hr | 4 hr | 8 hr | 24 hr |
| Goldblatt | 1 % CMC (Control) | | 252 | 253 | 239 | 245 | 247 | + 0.4 | 5.2 | 2.8 | 2.0 |
| | Methyldopa | 200 | 189 | 138 | 121 | 118 | 186 | 27.0 | 36.0 | 37.6 | 1.6 |
| | Methyldopa | 67 | 236 | 182 | 171 | 176 | 238 | 22.9 | 27.5 | 25.4 | + 0.8 |
| | Guanethidine | 25 | 200 | 178 | 173 | 183 | 187 | 11.0 | 13.5 | 8.5 | 6.5 |
| | Guanethidine | 8.3 | 241 | 239 | 230 | 226 | 235 | 0.8 | 4.6 | 6.2 | 2.5 |
| | PxPIFB-M | 25 | 204 | 172 | 159 | 172 | 185 | 15.7 | 22.1 | 15.7 | 9.3 |
| | PxPIFB-M | 8.3 | 256 | 237 | 232 | 231 | 251 | 7.4 | 9.4 | 9.8 | 1.9 |
| DOCA | 1% CMC (Control) | | 229 | 220 | 206 | 216 | 219 | 4.0 | 10.0 | 5.7 | 4.4 |
| | Methyldopa | 200 | 217 | 152 | 139 | 110 | 191 | 30.0 | 36.0 | 49.3 | 12.0 |
| | Methyldopa | 67 | 227 | 228 | 161 | 142 | 223 | + 0.4 | 29.1 | 37.4 | 1.8 |
| | Methyldopa | 25 | 208 | 194 | 203 | 203 | 204 | 6.7 | 2.4 | 2.4 | 1.9 |
| | Guanethidine | 25 | 237 | 172 | 174 | 159 | 213 | 27.4 | 26.6 | 32.9 | 10.1 |
| | Guanethidine | 8.3 | 243 | 217 | 217 | 202 | 228 | 10.7 | 10.7 | 16.9 | 6.2 |
| | PxPIFB-M | 25 | 220 | 196 | 188 | 160 | 217 | 10.9 | 14.5 | 27.3 | 1.4 |
| | PxPIFB-M | 8.3 | 216 | 214 | 208 | 203 | 212 | 0.9 | 3.7 | 6.0 | 1.9 |

Mean blood pressure is taken as the diastolic blood pressure plus of the difference between the diastolic and systolic blood pressures.

TABLE 2

Group mean systolic and diastolic blood pressure of Goldblatt hypertensive rats, before, and at 2, 4, 8 and 24 hours after drug administration Systolic & diastolic blood pressure (mmHg) ωS.E.

| Compound | Oral dose mg/kg | 0 hr Systolic | 0 hr Diastolic | 2 hr Systolic | 2 hr Diastolic | 4 hr Systolic | 4 hr Diastolic | 8 hr Systolic | 8 hr Diastolic | 24 hr Systolic | 24 hr Diastolic |
|---|---|---|---|---|---|---|---|---|---|---|---|
| 1% CMC (Control) |  | 262 | 231 | 262 | 235 | 251 | 215 | 258 | 218 | 259 | 223 |
|  |  | ω13.0 | ω10.9 | ω19.1 | ω16.8 | ω11.4 | ω 9.9 | ω14.8 | ω14.6 | ω12.1 | ω12.3 |
| Methyldopa | 200 | 200 | 166 | 145** | 124** | 129*** | 106*** | 128*** | 99*** | 194 | 170 |
|  |  | ω11.3 | ω11.7 | ω 6.8 | ω 6.0 | ω12.3 | ω10.3 | ω13.8 | ω12.3 | ω16.7 | ω14.0 |
| Methyldopa | 67 | 246 | 215 | 192* | 161* | 181** | 152* | 188*** | 153* | 254 | 206 |
|  |  | ω16.0 | ω15.5 | ω22.9 | ω21.3 | ω25.8 | ω23.6 | ω20.4 | ω17.9 | ω22.1 | ω20.8 |
| Guanthedine | 25 | 212 | 177 | 187 | 160 | 184** | 152** | 196** | 158* | 200 | 162 |
|  |  | ω10.1 | ω 8.8 | ω10.4 | ω 8.9 | ω 8.0 | ω 6.9 | ω12.1 | ω10.1 | ω11.8 | ω 9.8 |
| Guanthedine | 8.3 | 255 | 213 | 254 | 209 | 244 | 202 | 243 | 191 | 247 | 212 |
|  |  | ω19.6 | ω14.7 | ω17.4 | ω13.5 | ω15.3 | ω14.0 | ω14.8 | ω13.8 | ω18.5 | ω15.3 |
| PxPIFB-M | 25 | 214 | 185 | 182 | 151 | 167** | 142** | 183 | 150** | 196 | 164 |
|  |  | ω12.8 | ω12.3 | ω20.5 | ω15.2 | ω11.7 | ω10.0 | ω13.2 | ω10.9 | ω12.8 | ω11.0 |
| PxPIFB-M | 8.3 | 271 | 227 | 247 | 217 | 246** | 203** | 247** | 200* | 266 | 221 |
|  |  | ω27.0 | ω23.0 | ω22.9 | ω19.9 | ω27.7 | ω23.7 | ω27.2 | ω22.9 | ω25.1 | ω22.8 |

Significance of difference from the predose value (paired 't' test)
*P0.05
**P0.01
***P0.001

TABLE 3

Group mean systolic and diastolic blood pressure of DOCA hypertensive rats, before, and at 2, 4, 8 and 24 hours after drug administration Systolic & diastolic blood pressure (mmHg) ωS.E.

| Compound | Oral dose mg/kg | 0 hr Systolic | 0 hr Diastolic | 2 hr Systolic | 2 hr Diastolic | 4 hr Systolic | 4 hr Diastolic | 8 hr Systolic | 8 hr Diastolic | 24 hr Systolic |
|---|---|---|---|---|---|---|---|---|---|---|
| 1% CMC (Control) |  | 244 | 198 | 236 | 189 | 218 | 183 | 229 | 189 | 229 |
|  |  | ω13.0 | ω12.5 | ω15.7 | ω10.0 | ω10.0 | ω 9.4 | ω 9.1 | ω 9.6 | ω13.3 |
| Methyldopa | 200 | 229 | 193 | 169* | 118** | 148** | 117*** | 117*** | 95*** | 202 |
|  |  | ω19.2 | ω14.8 | ω22.1 | ω24.0 | ω19.4 | ω15.8 | ω 9.4 | ω 8.2 | ω10.8 |
| Methyldopa | 67 | 239 | 202 | 246 | 192 | 174** | 134*** | 154** | 119*** | 237 |
|  |  | ω15.2 | ω11.4 | ω17.3 | ω14.2 | ω 8.3 | ω11.2 | ω10.6 | ω12.5 | ω16.4 |
| Methyldopa | 25 | 220 | 183 | 205 | 172 | 215 | 178 | 216 | 176 | 214 |
|  |  | ω12.4 | ω12.4 | ω16.1 | ω18.0 | ω15.0 | ω15.8 | ω11.2 | ω12.6 | ω 7.4 |
| Guanethidine | 25 | 251 | 209 | 185** | 145** | 185** | 151** | 173** | 130** | 224 |
|  |  | ω12.5 | ω12.2 | ω19.2 | ω18.6 | ω17.7 | ω15.9 | ω14.1 | ω13.7 | ω15.1 |
| Guanethidine | 8.3 | 258 | 212 | 232* | 188 | 232 | 188 | 214* | 179* | 242 |
|  |  | ω16.8 | ω11.3 | ω13.0 | ω11.0 | ω18.6 | ω16.7 | ω13.2 | ω 9.7 | ω 9.9 |
| PxPIFB-M | 25 | 231 | 198 | 211 | 166** | 203 | 157** | 169* | 142* | 232 |
|  |  | ω15.0 | ω11.3 | ω12.7 | ω10.4 | ω10.6 | ω 6.8 | ω15.1 | ω13.4 | ω13.7 |
| PxPIFB-M | 8.3 | 228 | 191 | 223 | 196 | 219 | 187 | 216 | 178 | 223 |
|  |  | ω 8.9 | ω 7.5 | ω14.6 | ω18.2 | ω 9.9 | ω 8.6 | ω11.4 | ω11.0 | ω 9.3 |

Significance of difference from the predose value (paired 't' test)
*P0.05
**P0.01
***P0.001

TABLE 4

Means of systolic and diastolic blood pressure (in mmHg) before and after compound treatment

| compound | n |  | Blood pressure (Hours after treatment) | | | | |
|---|---|---|---|---|---|---|---|
|  |  |  | 0 | 1 | 3 | 6 | 24 |
| -methyldopa | 6 | Systolic | 246 | 211 | 193 | 174 | 236 |
| 25 mg/kg |  | Diastolic | 211 | 179 | 162 | 149 | 207 |
| Guanethidine | 3 | Systolic | 228 | 170 | 223 | 210 | 251 |
| 25 mg/kg |  | Diastolic | 192 | 150 | 188 | 182 | 219 |
| PxPIFB-M | 6 | Systolic | 239 | 177 | 167 | 177 | 208 |
| 25 mg/kg |  | Diastolic | 212 | 155 | 141 | 146 | 169 |

TABLE 5

Mean blood pressure of groups of Okamoto rats
with the percentage of the blood pressure modification

| compound | n | | Blood pressure (Hours after treatment) | | | | |
|---|---|---|---|---|---|---|---|
| | | | 0 | 1 | 3 | 6 | 24 |
| -methyldopa 25 mg/kg | 6 | blood press. % modificat. | 234 | 200 14.5 | 183 21.8 | 166 29.1 | 226 3.4 |
| Guanethidine 25 mg/kg | 3 | blood press. % modificat. | 216 | 163 24.5 | 211 2.3 | 201 6.9 | 240 +11.1 |
| PxPIFB-M 25 mg/kg | 6 | blood press. % modificat. | 230 | 170 26.1 | 158 31.3 | 167 27.4 | 195 15.2 |

I claim:
1. A therapeutically acceptable acid addition salt of a compound of the formula

2.

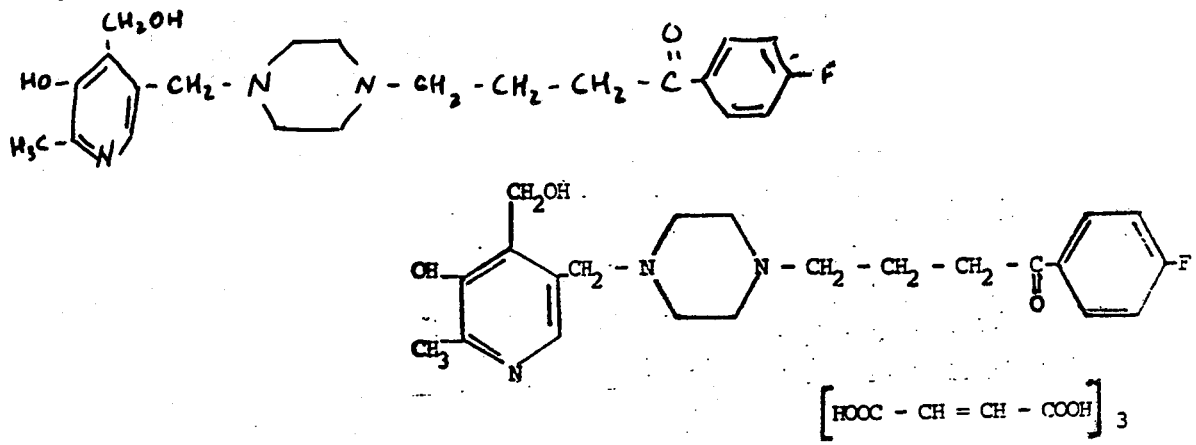

* * * * *

UNITED STATES PATENT OFFICE
CERTIFICATE OF CORRECTION

PATENT NO. : 3,903,088
DATED : September 2, 1975
INVENTOR(S) : Andre Esanu

It is certified that error appears in the above-identified patent and that said Letters Patent are hereby corrected as shown below:

Column 1, cancel lines 5 and 6.

Column 1, line 10, "N" should read -- N' --.

Column 1, line 37, "blocking" should read -- a-blocking --.

Column 2, line 52, "-- -methyldoap"- should read -- a-methyldopa --.

Column 2, line 59, "--methyldopa-- should read -- a -methyldopa --.

Column 3 and 4 cancel Table 1 as shown and substitute the attached Table 1.

Columns 5 and 6, cancel Tables 2, 3 and 4 as shown and substitute the attached Tables.

Column 7, cancel Table 5 and substitute the attached Table.

Column 7, line 13, cancel "2" and insert -- 2 -- at the beginning of line 17.

Signed and Sealed this

Thirteenth Day of July 1976

[SEAL]

Attest:

RUTH C. MASON
Attesting Officer

C. MARSHALL DANN
Commissioner of Patents and Trademarks

TABLE 1

The mean blood pressures of each group taken before and at 2, 4, 8 and 24 hours after drug administration and percentage change of mean blood pressure from the value before drug administration (0 hr.)

| Model of hyperten-sion | Compound | Oral dose mg/kg | Mean BP (mmHg) at time | | | | | % change in mean BP from 0 hr | | | |
|---|---|---|---|---|---|---|---|---|---|---|---|
| | | | 0 hr | 2 hr | 4 hr | 8 hr | 24 hr | 2 hr | 4 hr | 8 hr | 24 hr |
| Goldblatt | 1% CMC (Control) | | 252 | 253 | 239 | 245 | 247 | + 0.4 | - 5.2 | - 2.8 | - 2.0 |
| | Methyldopa | 200 | 189 | 138 | 121 | 118 | 186 | -27.0 | -36.0 | -37.6 | - 1.6 |
| | Methyldopa | 67 | 236 | 182 | 171 | 176 | 238 | -22.9 | -27.5 | -25.4 | + 0.8 |
| | Guanethidine | 25 | 200 | 178 | 173 | 183 | 187 | -11.0 | -13.5 | - 8.5 | - 6.5 |
| | Guanethidine | 8.3 | 241 | 239 | 230 | 226 | 235 | - 0.8 | - 4.6 | - 6.2 | - 2.5 |
| | PxPIFB-M | 25 | 204 | 172 | 159 | 172 | 185 | -15.7 | -22.1 | -15.7 | - 9.3 |
| | PxPIFB-M | 8.3 | 256 | 237 | 232 | 231 | 251 | - 7.4 | - 9.4 | - 9.8 | - 1.9 |
| DOCA | 1% CMC (Control) | | 229 | 220 | 206 | 216 | 219 | - 4.0 | -10.0 | - 5.7 | - 4.4 |
| | Methyldopa | 200 | 217 | 152 | 139 | 110 | 191 | -30.0 | -36.0 | -49.3 | -12.0 |
| | Methyldopa | 67 | 227 | 228 | 161 | 142 | 223 | + 0.4 | -29.1 | -37.4 | - 1.8 |
| | Methyldopa | 25 | 208 | 194 | 203 | 203 | 204 | - 6.7 | - 2.4 | - 2.4 | - 1.9 |
| | Guanethidine | 25 | 237 | 172 | 174 | 159 | 213 | -27.4 | -26.6 | -32.9 | -10.1 |
| | Guanethidine | 8.3 | 243 | 217 | 217 | 202 | 228 | -10.7 | -10.7 | -16.9 | - 6.2 |
| | PxPIFB-M | 25 | 220 | 196 | 188 | 160 | 217 | -10.9 | -14.5 | -27.3 | - 1.4 |
| | PxPIFB-M | 8.3 | 216 | 214 | 208 | 203 | 212 | - 0.9 | - 3.7 | - 6.0 | - 1.9 |

Mean blood pressure is taken as the diastolic blood pressure plus 2/3 of the difference between the diastolic and systolic blood pressures.

Patent No. 3,903,088

TABLE 2

Group mean systolic and diastolic blood pressure of Goldblatt hypertensive rats, before, and at 2, 4, 8 and 24 hours after drug administration

| Compound | Oral dose mg/kg | Systolic & diastolic blood pressure (mmHg) ±S.E. | | | | | | | | | |
|---|---|---|---|---|---|---|---|---|---|---|---|
| | | 0 hr | | 2 hr | | 4 hr | | 8 hr | | 24 hr | |
| | | Systolic | Diastolic | Systolic | Diastolic | Systolic | Diastolic | Systolic | Diastolic | Systolic | Diastolic |
| 1% CMC (Control) | | 262 ±13.0 | 231 ±10.9 | 262 ±19.1 | 235 ±16.8 | 251 ±11.4 | 215 ±9.9 | 258 ±14.8 | 218 ±14.6 | 259 ±12.1 | 223 ±12.3 |
| Methyldopa | 200 | 200 ±11.3 | 166 ±11.7 | 145** ±6.8 | 124** ±5.0 | 129*** ±12.3 | 106*** ±10.3 | 128*** ±13.8 | 99*** ±12.3 | 194 ±16.7 | 170 ±14.0 |
| Methyldopa | 67 | 246 ±16.0 | 215 ±15.5 | 192* ±22.9 | 161* ±21.3 | 181** ±25.8 | 152* ±23.6 | 188*** ±20.4 | 153* ±17.9 | 254 ±22.1 | 206 ±20.3 |
| Guanethidine | 25 | 212 ±10.1 | 177 ±8.8 | 187 ±10.4 | 160 ±8.9 | 184** ±8.0 | 152** ±6.9 | 196** ±12.1 | 158** ±10.1 | 200 ±11.8 | 162 ±9.8 |
| Guanethidine | 8.3 | 255 ±19.6 | 213 ±14.7 | 254 ±17.4 | 209 ±13.5 | 244 ±15.3 | 202 ±14.0 | 243 ±14.8 | 191 ±13.8 | 247 ±18.5 | 212 ±15.3 |
| RoDIPR-M | 25 | 214 ±12.8 | 185 ±12.3 | 182 ±20.5 | 151 ±15.2 | 167** ±11.7 | 142** ±10.0 | 183 ±13.2 | 150** ±10.9 | 196 ±12.9 | 164 ±11.0 |
| RoDIPR-M | 8.3 | 271 ±27.0 | 227 ±23.0 | 247 ±22.9 | 217 ±19.9 | 246** ±27.7 | 203** ±23.7 | 247** ±27.2 | 200* ±22.9 | 266 ±25.1 | 221 ±22.8 |

Significance of difference from the predose value (paired 't' test)

\* P<0.05
\*\* P<0.01
\*\*\* P<0.001

Patent No. 3,903,088

TABLE 3

Group mean systolic and diastolic blood pressure of DOCA hypertensive rats, before, and at 2, 4, 8 and 24 hours after drug administration

| Compound | Oral dose mg/kg | Systolic & diastolic blood pressure (mmHg) ± S.E. | | | | | | | | | | |
|---|---|---|---|---|---|---|---|---|---|---|---|---|
| | | 0 hr | | 2 hr | | 4 hr | | 8 hr | | 24 hr | | |
| | | Systolic | Diastolic | Systolic | Diastolic | Systolic | Diastolic | Systolic | Diastolic | Systolic | Diastolic | |
| 1% CMC (Control) | | 244 ±13.0 | 198 ±12.5 | 236 ±15.7 | 189 ±10.0 | 218 ±10.0 | 183 ± 9.4 | 229 ± 9.1 | 189 ± 9.6 | 229 ±13.3 | | |
| Methyldopa | 200 | 229 ±19.2 | 193 ±14.6 | 169* ±22.1 | 118** ±24.0 | 148** ±19.4 | 170** ±15.8 | 117*** ± 9.4 | 95** ± 8.2 | 202 ±10.8 | | |
| Methyldopa | 67 | 239 ±15.2 | 202 ±11.4 | 246 ±17.3 | 192 ±14.2 | 174** ± 8.3 | 134*** ±11.2 | 154** ±10.6 | 119*** ±12.5 | 237 ±16.4 | | |
| Methyldopa | 25 | 220 ±12.4 | 183 ±12.4 | 205 ±16.1 | 172 ±18.0 | 215 ±15.0 | 178 ±15.8 | 216 ±11.2 | 176 ±12.6 | 214 ± 7.4 | | |
| Guanethidine | 25 | 251 ±12.5 | 209 ±12.2 | 185** ±19.2 | 145** ±18.6 | 185** ±17.7 | 151** ±15.9 | 173** ±14.1 | 130** ±13.7 | 224 ±15.1 | | |
| Guanethidine | 8.3 | 258 ±16.8 | 212 ±11.3 | 232* ±13.0 | 188 ±11.0 | 232 ±18.6 | 168 ±16.7 | 214 ±13.2 | 179* ± 9.7 | 242 ± 9.9 | | |
| PxPIFB-M | 25 | 231 ±15.0 | 198 ±11.3 | 211 ±12.7 | 166** ±10.4 | 203 ±10.6 | 157** ± 6.9 | 169* ±15.1 | 142* ±13.4 | 232 ±13.7 | | |
| PxPIFB-M | 8.3 | 228 ± 8.9 | 191 ± 7.5 | 223 ±14.6 | 196 ±18.2 | 219 ± 9.9 | 187 ± 8.6 | 216 ±11.4 | 178 ±11.0 | 223 ± 9.3 | | |

Significance of difference from the predose value (paired 't' test)
* P<0.05
** P<0.01
*** P<0.001

TABLE 4

Means of systolic and diastolic blood pressure
(in mmHg) before and after compound treatment

| compound | n | | Blood pressure (Hours after treatment) | | | | |
|---|---|---|---|---|---|---|---|
| | | | 0 | 1 1/2 | 3 | 6 | 24 |
| α-methyldopa 25 mg/kg | 6 | Systolic | 246 | 211 | 193 | 174 | 236 |
| | | Diastolic | 211 | 170 | 162 | 149 | 207 |
| Guanethidine 25 mg/kg | 3 | Systolic | 228 | 170 | 223 | 210 | 251 |
| | | Diastolic | 192 | 150 | 188 | 182 | 219 |
| PxPIFB-M 25 mg/kg | 6 | Systolic | 239 | 177 | 167 | 177 | 208 |
| | | Diastolic | 212 | 155 | 141 | 146 | 169 |

TABLE 5

Mean blood pressure of groups of Okamoto rats
with the percentage of the blood pressure modification

| compound | n | | Blood pressure (Hours after treatment) | | | | |
|---|---|---|---|---|---|---|---|
| | | | 0 | 1 1/2 | 3 | 6 | 24 |
| α-methyldopa 25 mg/kg | 6 | blood press. | 234 | 200 | 183 | 166 | 226 |
| | | % modificat. | | -14.5 | -21.8 | -29.1 | -3.4 |
| Guanethidine 25 mg/kg | 3 | blood press. | 216 | 163 | 211 | 201 | 240 |
| | | % modificat. | | -24.5 | -2.3 | -6.9 | +11.1 |
| PxPIFB-M 25 mg/kg | 6 | blood press. | 230 | 170 | 158 | 167 | 195 |
| | | % modificat. | | -26.1 | -31.3 | -27.4 | -15.2 |